United States Patent [19]

Ohmori et al.

[11] 4,335,430
[45] Jun. 15, 1982

[54] CONTROL AND COMPENSATION DEVICE IN AN ANTI-SKID CONTROL SYSTEM

[75] Inventors: Taiji Ohmori, Kawagoe; Makoto Sato, Kamifukuoka, both of Japan

[73] Assignee: Honda Giken Kogyo Kabushiki Kaisha, Shibuya, Japan

[21] Appl. No.: 121,585

[22] Filed: Feb. 14, 1980

[30] Foreign Application Priority Data

Mar. 16, 1979 [JP] Japan ................................. 54-30723

[51] Int. Cl.³ ................................................ B60T 8/00
[52] U.S. Cl. ....................................... 364/426; 303/92
[58] Field of Search ...................... 364/426; 371/8, 11; 303/92, 95, 96, 109

[56] References Cited

U.S. PATENT DOCUMENTS

| | | | |
|---|---|---|---|
| 4,013,324 | 3/1977 | Quon | 303/92 |
| 4,061,402 | 12/1977 | Peterson et al. | 303/92 |
| 4,106,821 | 8/1978 | Brearley | 303/92 |
| 4,143,926 | 3/1979 | Miller | 303/92 |

Primary Examiner—Jerry Smith
Attorney, Agent, or Firm—Armstrong, Nikaido, Marmelstein & Kubovcik

[57] ABSTRACT

A control and compensation device in an anti-skid control system in which wheel speed detectors detect peripheral speeds of wheels to produce wheel speed signals. A main control circuit receives wheel speed signals, and an electromagnetic actuator is provided for actuating the anti-skid control device. A control and compensation circuit is arranged so that when the wheel speed signal indicates the locked state of wheels continuously more than a predetermined period of time, the electromagnetic actuator is immediately placed in an energized state only for a predetermined time to produce an output signal for releasing the braking force. There is provided a group of first circuits which is disposed on each wheel and designed so that when the wheel speed signal indicates the locked state of wheel for a period in excess of a predetermined time, an output signal is immediately produced whereas when the wheel speed signal indicates the release of the locked state, the output signal is immediately stopped. A second circuit is also provided so that when at least one of the first circuits produces an output signal, an output signal for actuating the electromagnetic actuator is produced.

7 Claims, 6 Drawing Figures

CONTROL AND COMPENSATION DEVICE IN AN ANTI-SKID CONTROL SYSTEM

BACKGROUND OF THE INVENTION

The present invention relates to a control and compensation device in an anti-skid control system which is actuated so as to immediately release the braking force of wheels only for a predetermined period of time. The present invention takes the place of the controlling operation of a conventional anti-skid control system, when the wheels are in a locked state continuously for more than a predetermined time as a result of the condition that the antiskid control system for a vehicle including a main control circuit for producing anti-skid control signals to control the braking force of the wheels is out of order for one reason or another, by detecting such a locked state.

Trouble modes of the anti-skid control system considered, include the following two types: a first type is the trouble wherein the braking force does not at all exert on the wheels, and a second type is the trouble wherein the braking force exerts on the wheels but the anti-skid function is lost. In the past, in particular, importance is attached to the aforementioned first type of the trouble. It has been usual that when the first type of trouble occurs, the power supply of the anti-skid control system is immediately cut off to stop the anti-skid function and to thereby assume the same state as the second type of trouble. On the other hand, when the second type of the trouble occurs, an alarm is merely given.

Generally, there is a significant difference between the braking sense when the anti-skid function is exercised and the braking sense when the anti-skid function is not exercised. Particularly, in a vehicle in which the braking force of a plurality of or all wheels is controlled by a single anti-skid control system, in the event that the anti-skid function is rapidly stopped due to the trouble of the anti-skid control system, it is extremely difficult for a driver, who is wholly accustomed to an ordinary braking sense, to rapidly follow the braking sense so that a great braking force is exerted on each of wheels in the ordinary braking sense. As a consequence, each wheel tends to assume a locked state, thus posing various inconveniences in driving the vehicle.

In order to minimize the disadvantages noted above, there is provided an anti-skid brake device wherein a plurality of anti-skid control systems actuated independently each other are provided one on each of wheels so that even if either of the anti-skid systems is out of order, no influence would be exerted on the anti-skid function of wheels other than the wheel corresponding to the disordered anti-skid control system. In this case, however, if the anti-skid control systems corresponding to the rear wheels are out of order, it is likely that anti-skid function is applied to only the front wheels whereby the front wheels are not locked but only the rear wheels are locked. If such a state should occur, the running of the vehicle becomes extremely unstablized to cause an abrupt whirl. This is more of a dangerous state than in the case where all wheels are locked.

SUMMARY OF THE INVENTION

It is therefore a primary object of the present invention to provide a control and compensation device in an anti-skid control system which can compensate for the trouble of the anti-skid control system in such a manner that the locked state of wheels does not continue more than a predetermined period of time, even if the anti-skid control system is out of order and whatever trouble mode may prevail.

It is a further object of the present invention to provide a control and compensation device in an anti-skid control system which is actuated so as to immediately release the braking force of wheels only for a predetermined period of time, when a locked state of the wheels continues for a predetermined period of time resulting from trouble of the anti-skid control system.

It is another object of the present invention to provide a control and compensation device in an anti-skid control system wherein an anti-skid control system for collectively controlling the braking force of a plurality of selected wheels is out of order, whereby when at least one of the plurality of wheels assumes a locked state continuously more than a prdetermined period of time, the braking force of all the plurality of wheels is immediately released only for a predetermined period of time.

It is yet another object of the present invention to provide a control and compensation device in an anti-skid control system which is simple in structure and positive in operation, and which can assure safety driving at all times without rapidly changing the braking sense even if the antiskid control system should be out of order.

DESCRIPTION OF THE PREFERRED EMBODIMENTS

Embodiments of the present invention will now be described with reference to the accompanying drawings.

Figure 1:
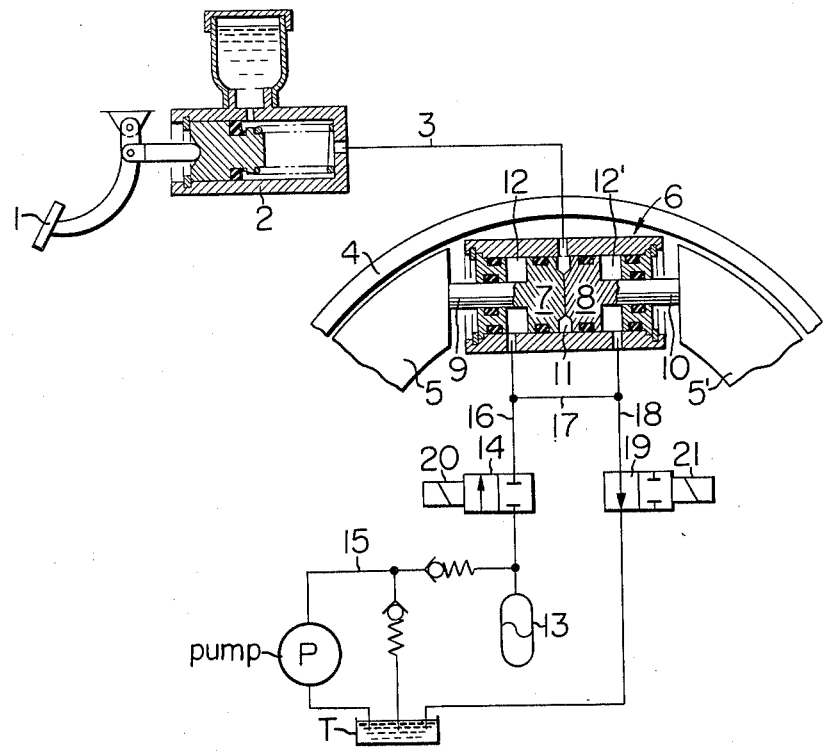
FIG. 1 is an explanatory view of an essential portion in section showing one embodiment of a conventional anti-skid brake device.

First, a conventional anti-skid brake device will be explained by way of a concrete embodiment for a better understanding of the operation of an anti-skid control system. Referring to FIG. 1, a brake pedal 1 is operatively connected to a master cylinder 2, and when the driver steps on the brake pedal 1, the master cylinder 2 produces a braking oil pressure. The master cylinder 2 communicates through an oil passage 3 with a braking oil chamber 11 defined between a pair of pistons 7 and 8 within a wheel cylinder 6, which is mounted on a vehicle body. The pistons 7 and 8 have respective rods 9 and 10 which extend outwardly through the end wall of wheel cylinder 6. The rods 9 and 10 have their outer ends connected to a pair of brake shoes 5, 5' which can be brought into contact with a brake drum 4 mounted in the wheel to produce thereby the braking torque. Thus, when the brake pedal is stepped on so that the master cylinder 2 produces the braking oil pressure, this braking oil pressure is transmitted into the braking oil chamber 11 via the oil passage 3. As a result, the pistons 7 and 8 are urged away from each other and consequently, the brake shoes 5, 5' are urged against the frictional surface of the brake drum 4 to produce braking torque in cooperation with the brake drum 4 on the wheels.

If the braking oil pressure within the braking oil chamber 11 is too great, the braking torque produced between each of the brake shoes 5, 5' and the brake drum 4 becomes excessive, so that the wheels are brought into a locked state. In order to prevent such a dangerous state, a pair of control oil chambers 12, 12' are provided between each of pistons 7, 8 and the end wall of the wheel cylinder 6. The control oil pressure within these control oil chambers 12, 12' may be controlled so that when any possibility or danger of locking the wheels due to excessively large braking oil pressure within the braking oil chamber 11 occurs, movement of the piston 7 and 8 arising from the braking oil pressure may be restrained.

Next, an explanation will be given for the control device for controlling the control oil pressure within the control oil chambers 12 and 12'. The control oil pumped up and then pressurized by a pump P from an oil tank T is fed through an oil passage 15 and a pressure accumulator 13, to a port on the inlet side of an inlet valve 14 which is switched and controlled by an electromagnetic actuator 20. A port on the outlet side of the inlet valve 14 communicates with the control oil chamber 12 through an oil passage 16 and with the control oil chamber 12' through an oil passage 17, respectively. The control oil chamber 12 is connected with a port on the inlet side of an outlet valve 19 which is switched and controlled by an electromagnetic actuator 21 through the oil passage 16, oil passage 17 and oil passage 18. The control oil chamber 12' is also connected with the port on the inlet side of the outlet valve 19 through the oil passage 18. A port on the outlet side of the outlet valve 19 is connected with the oil tank T.

The inlet valve 14 is normally held in a position displaced to the right in FIG. 1. In this position the control oil chambers 12, 12' are cut off from the pump P and the pressure accumulator 13. When the electromagnetic actuator 20 is electrically energized to operate the inlet valve 14, the inlet valve 14 is displaced to the left in FIG. 1, and as a result, the control oil fed from the pump P is fed under pressure into the control oil chambers 12, 12' through the accumulator 13 and inlet valve 14 to urge the pistons 7 and 8 to approach each other against the pressure of the braking oil within the braking oil chamber 11.

The outlet valve 19 is normally held in a position displaced to the left in FIG. 1. In this position, the control oil chambers 12, 12' are connected to the oil tank T through the outlet valve 19. When the electromagnetic actuator 21 is electrically energized to operate the outlet valve 19, the outlet valve 19 is displaced to the right in FIG. 1, and the control oil chambers 12, 12' are cut off from the oil tank T.

In a first operating state wherein the inlet valve 19 is in the right position and the outlet valve 19 is in the left position, that is, neither of the electromagnetic actuators 20 and 21 is energized, the control oil chambers 12, 12' are open to the oil tank T and hence, the pistons 7 and 8 are moved only by the braking oil pressure within the braking oil chamber 11. As a consequence, the braking torque at the time of braking increases freely in accordance with the braking action of the driver.

In a second operating state wherein the outlet valve 19 is displaced to the right position, that is, the electromagnetic actuator 21 is energized, the control oil chambers 12, 12' are cut off from the oil tank T to place the control oil within the control oil chambers 12, 12' in a locked state. Thus, even if the braking oil pressure within the braking oil chamber 11 continues to increase, further movement of the pistons 7 and 8 is checked. As a result, the braking torque at the time of braking is limited to a given magnitude independent of the braking action of the driver, and thus, the aforementioned second state is adapted to the case in which the possibility of locking of the wheel occurs.

In a third operating state wherein the inlet valve 14 is displaced to the left and the outlet valve 19 is displaced to the right position, that is, both electromagnetic actuators 20 and 21 are energized, control oil fed from the pump P is fed under pressure into the control oil chambers 12, 12' through the accumulator 13 and inlet valve 14, and the control oil chambers 12, 12' are cut off from the oil tank T. Consequently, the pistons 7 and 8 approach each other against the control oil pressure inside the control oil chamber 11, and the braking torque at the time of braking decreases independent of the braking action of the driver and thus, this third state is adapted for the case in which the danger of locking of the wheels occurs.

Next, the anti-skid control system for controlling the operation of the anti-skid brake device as shown in FIG. 1 will be explained.

Figure 2:
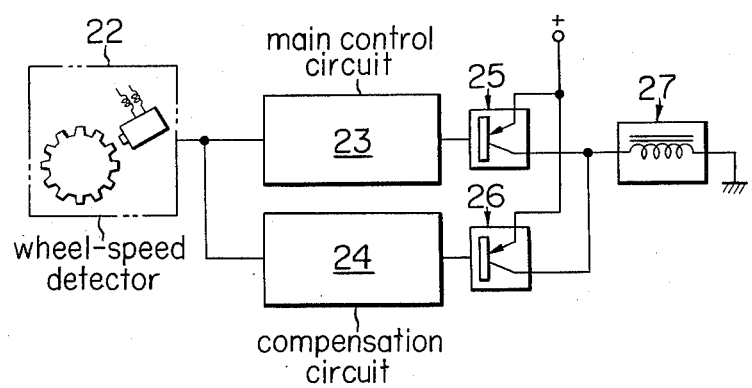
FIG. 2 is a circuit diagram showing one example of a control and compensation device according to the present invention in an anti-skid control system.

In FIG. 2, a wheel speed detector 22 for detecting the peripheral speed of the wheel to produce a wheel speed signal in connection with the peripheral speed of the wheel feeds its output signal to a main control circuit 23. The main control circuit 23 is designed so as to presume the vehicle speed from the wheel speed signal, obtain the wheel acceleration, add the reference slip rate to the vehicle speed, to thereby set the reference wheel speed, compare the wheel speed signal with the reference wheel speed signal, and compare the wheel acceleration signal with a predetermined reference wheel acceleration signal. When a danger of locking the wheels is judged to occur, an output signal is produced and this output signal is applied to an electromagnetic actuator 27 through an output transistor 25.

In this case, the main control circuit 23 is not necessarily limited to the structure as described above. Other structures may also be employed as far as the output signal can be produced when a danger of locking the wheels occurs. Further, while the main control circuit 23 shown in FIG. 2 is designed to feed a single output signal to a single electromagnetic actuator 27, it should be understood that in the case where the anti-skid brake device is actuated by a pair of electromagnetic actuators 20 and 21 as in the conventional embodiment shown in FIG. 1, the main control circuit 23 may produce a pair of output signals different from each other with respect to the respectively corresponding electromagnetic actuators 20 and 21.

The electromagnetic actuator 27, when receiving the output signal from the main control circuit 23, is immediately placed in an energized state to actuate the anti-skid brake device so as to release the braking force in a manner similar to the case in which both the electromagnetic actuators 20 and 21 are placed in an energized state in FIG. 1. When danger of locking the wheels ceases to exist, the main control device 23 stops producing the output signal and at the same time the electromagnetic actuator 27 assumes a deenergized state to actuate the anti-skid brake device so as to impart again the braking force to the wheels. Thereafter, such an operation as just described is repeated and the vehicle speed as a whole decreases.

Thus, the wheels never assume a locked state while the anti-skid control system including the main control circuit 23 and the output transistor 25 is operating properly. In case of the first type of trouble wherein the braking force is not at all applied to the wheels in the anti-skid control system, an alarm is immediately initiated and the power supply of the anti-skid control system is cut off, resulting in a state where the braking force may increase freely. On the other hand, in case the second type of trouble occurs wherein the braking force is exerted on the wheels but the anti-skid function is lost in the anti-skid control system, an alarm is immediately initiated. In any case, if the anti-skid control system is out of order, a state prevails in which wheels tend to be locked.

In the following the compensation device relative to the troubles involved in the anti-skid control system, as described above, will be explained.

In FIG. 2, a control and compensation circuit 24 and an output transistor 26 which constitute a control and compensation device are connected in parallel with the main control circuit 23 and the output transistor 25. The control and compensation circuit 24 is designed to receive, as an input signal, a wheel speed signal produced by the wheel speed detector 22, and an output signal thereof is applied to the electromagnetic actuator 27 through the output transistor 26.

Figure 3:
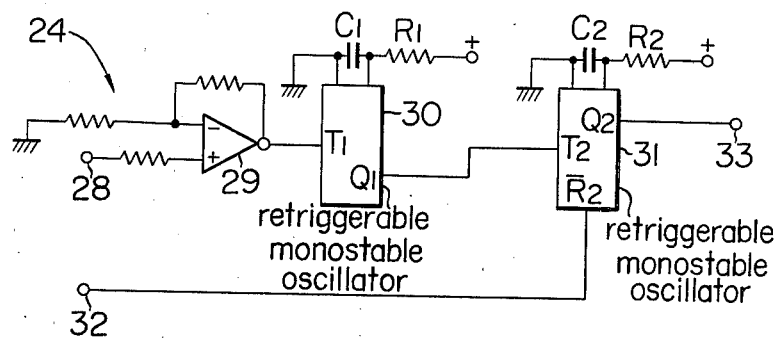
FIG. 3 is a circuit diagram showing a preferred embodiment of the control and compensation circuit in FIG. 2.
Figure 4:
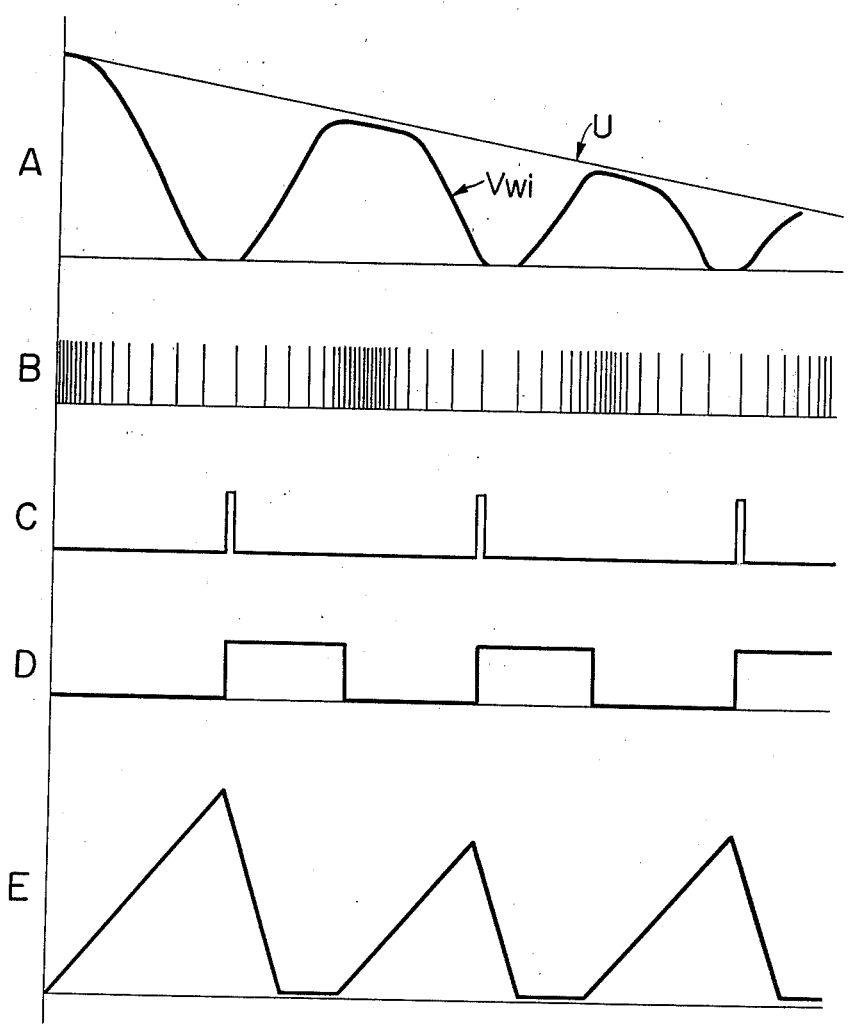
FIG. 4 shows waveforms of various signals.

A detailed circuit diagram of the control and compensation circuit 24 is shown in FIG. 3. The wheel speed signal is applied to an operational amplifier 29 through an input terminal 28. Assume here that signal waveforms of the vehicle speed signal U and the wheel speed signal Vwi for the wheels for which braking force is controlled, varied with time form the signal waveforms as shown in FIG. 4(A). Then the operational amplifier 29 regulates the wheel speed signal Vwi into a pulse waveform signal of a given amplitude and applies its output signal to an input terminal $T_1$ of a retriggerable monostable oscillator (multivibrator) 30 which constitutes a first circuit of the present invention. The retriggerable monostable oscillator 30 produces, whenever a pulse signal is applied to the input terminal $T_1$, a pulse signal of a given time width $t_1$ determined by a capacitor $C_1$ and a resistor $R_1$. However, since the oscillator is retriggerable, if an interval of the input pulse is less than the given time width $t_1$, an output signal of level "L" is always produced in the output terminal $\overline{Q}_1$, and when the interval of the input pulse reaches the given time width $t_1$, an output signal inverted into level "H" is produced from the output terminal $\overline{Q}_1$. Accordingly, the retriggerable monostable oscillator 30 produces a pulse signal as shown in FIG. 4(C), which is applied to an input terminal $T_2$ of a retriggerable monostable oscillator 31 which constitutes a second circuit of the present invention.

The retriggerable monostable oscillator 31 produces, when an input pulse signal applied to the input terminal $T_2$ thereof is inverted from level "L" to "H", a pulse signal of a given time width $t_2$ determined by a capacitor $C_2$ and a resistor $R_2$, from the output terminal $Q_2$.

Accordingly, the retriggerable monostable oscillator 31 produces a pulse signal as shown in FIG. 4(D), which is applied to the output transistor 26 through the output terminal 33.

The retriggerable monostable oscillator 31 has a reset terminal $\overline{R}_2$, which is, in turn, connected to a reset signal generator 32. The reset signal generator 32 generates, when the vehicle speed is so decreased as not to require the anti-skid operation, a reset signal. This signal is then applied to the retriggerable monostable oscillator 31. The retriggerable monostable oscillator 31 produces no output signal while the reset signal is received at the reset terminal $\overline{R}_2$.

Since the control and compensation device shown in FIGS. 2 and 3 is constructed as described above, when the wheel speed signal produced by the wheel speed detector 22 indicates the locked state of wheels continuously more than the predetermined time $t_1$ resulting from the trouble of the anti-skid control system, the retriggerable monostable oscillator 30 immediately starts producing an output signal; when the wheel speed signal indicates that the locked state of wheels has been released, the oscillator immediately stops producing the output signal; and when the retriggerable monostable oscillator 30 starts producing an output signal, the retriggerable monostable oscillator 31 immediately produces an output signal of a predetermined time width $t_2$ to energize the electromagnetic actuator 27. When the electromagnetic actuator 27 is brought into the energized state, the anti-skid brake device immediately releases the braking force to release the wheels from their locked state. Thus, the braking force is varied with time as shown in FIG. 4(E). When the vehicle speed decreases so that the value of the vehicle speed signal is smaller than that of the predetermined low reference vehicle speed signal, that is, when the vehicle speed is so decreased as not to require the anti-skid operation, the reset signal generator 32 generates a reset signal whereby the retriggerable monostable oscillator 31 does not at all produce an output signal and as a result, the electromagnetic actuator 27 is not energized.

Figure 5:
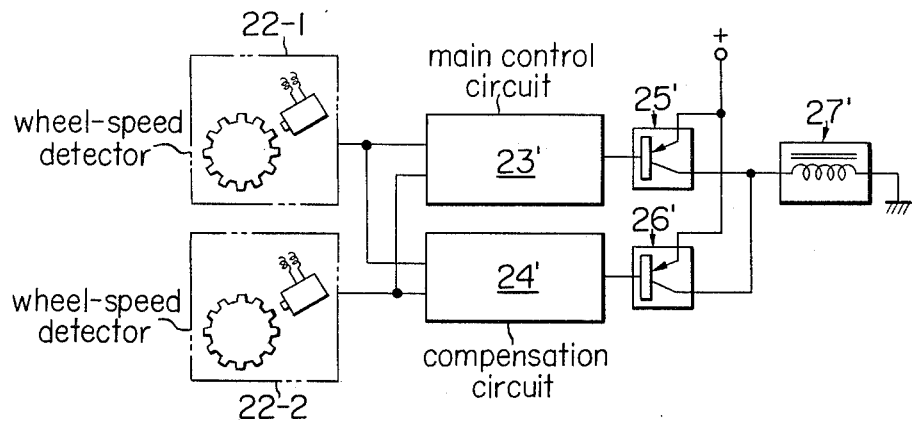
FIG. 5 is a circuit diagram showing one embodiment of a control and compensation device of the invention in an anti-skid control system different from that shown in FIG. 2.

FIG. 5 shows one embodiment of a control and compensation device for an anti-skid control system for collectively controlling the braking force of a plurality of selected wheels. A main control circuit 23' having a function similar to that of the main control circuit 23 shown in FIG. 2 is designed so as to receive, as an input signal, wheel speed signals respectively produced by a pair of wheel speed detectors 22-1 and 22-2, and to apply its output signal to an electromagnetic actuator 27' through an output transistor 25' so that when danger of locking occurs in at least one of the selected wheels, the electromagnetic actuator 27' is immediately brought into an energized state to release the braking force of all the selected wheels. On the other hand, a control and compensation circuit 24' is designed so as to receive, as an input signal, the wheel speed signals produced by the wheel speed detectors 22-1 and 22-2, and to apply its output signal to the electromagnetic actuator 27' through an output transistor 26'.

Figure 6:
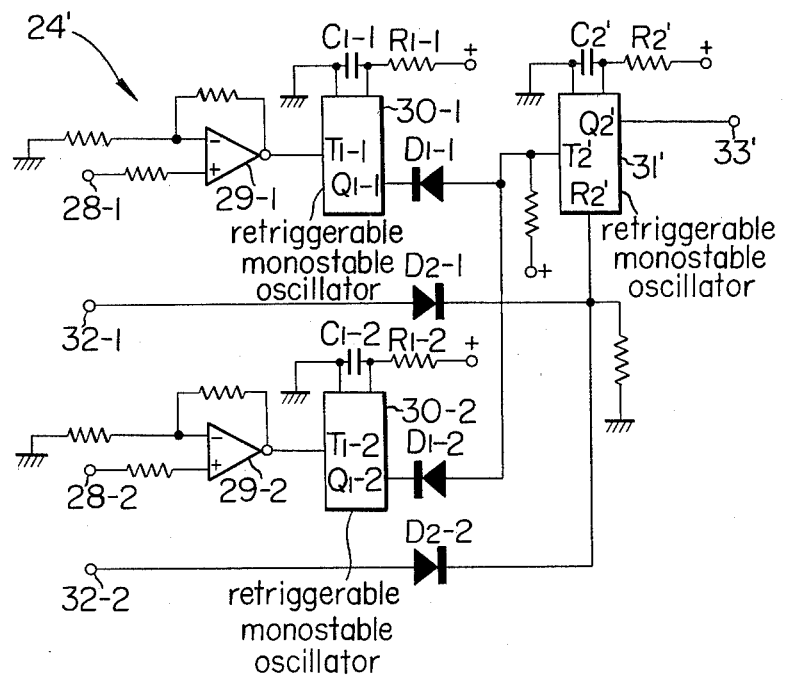
FIG. 6 is a circuit diagram showing a preferred embodiment of the control and compensation circuit in FIG. 5.

FIG. 6 shows a specific embodiment of the control and compensation circuit 24'. A pair of input terminals 28-1 and 28-2 receive corresponding wheel speed signals and feed already modulated wheel speed signals through corresponding operational amplifiers 29-1 and 29-2, having a function similar to the operational amplifier 29 shown in FIG. 3, to input terminals $T_1$-1 and $T_1$-2 of retriggerable monostable oscillators 30-1 and 30-2. These have a function similar to the retriggerable monostable oscillator 30 shown in FIG. 3.

The retriggerable monostable oscillator 30-1 has a response characteristic determined by a capacitor $C_1$-1 and a resistor $R_1$-1 and applies its output signal from an output terminal $\overline{Q}_1$-1 to an input terminal $T_2'$ of a retriggerable monostable oscillator 31' having a function similar to that of the retriggerable monostable oscillator 31 shown in FIG. 3 through a diode $D_1$-1. Also, a retriggerable monostable oscillator 30-2 has a response characteristic determined by a capacitor $C_1$-2 and a resistor $R_1$-2 and applies its output signal from an output terminal $\overline{Q}_1$-2 to an input terminal $T_2'$ of the retriggerable monostable oscillator 31' through a diode $D_1$-2.

The retriggerable monostable oscillator 31' has a response characteristic determined by a capacitor $C_2'$ and a resistor $R_2'$ and is responsive to the first pulse signal out of pulse signals produced by the retriggerable monostable oscillators 30-1 and 30-2 to produce a pulse signal of a given time width. It applies its output signal to the electromagnetic actuator 27' through an output terminal 33' and an output transistor 26', thereby placing the electromagnetic actuator 27' in an energized state.

The retriggerable monostable oscillator 31' has a reset terminal $\overline{R}_2'$ connected to a reset signal generator 32-1 through a diode $D_2$-1 and also connected to a reset signal generator 32-2 through a diode $D_2$-2. The reset signal generators 32-1 and 32-2 correspondingly receive output signals of a pair of vehicle speed detectors for independently detecting vehicle speeds and producing respective reset signals when the value of the vehicle speed signal produced by the vehicle speed detectors is smaller than that of a predetermined low reference vehicle speed signal. Accordingly, the retriggerable monostable oscillator 31' produces no output signal while at least one of the reset signal generators 32-1 and 32-2 generates a reset signal because the vehicle speed is reduced by action of the diodes $D_2$-1 and $D_2$-2, and hence the electromagnetic actuator 27' is not energized during that time.

As described above, in accordance with the present invention, there is provided a control and compensation circuit wherein when the wheel speed signal indicates the locked state of wheels continuously more than a predetermined period of time, the electromagnetic actuator is placed in an energized state immediately only for a predetermined period of time to thereby produce an output signal for releasing the braking force. Therefore, even if the normally operating anti-skid control system is out of order, there occurs no dangerous state because the wheels are thrown into a locked state for a period more than a predetermined period of time. In addition, in the present invention, there is provided a group of first circuits and a single second circuit. The first circuit is disposed in each of a plurality of selected wheels and designed so that when the wheel speed signals produced by the corresponding wheel speed detectors indicate the locked state of corresponding wheels continuously more than a predetermined period of time, an output signal immediately begins to be produced. On the other hand, when the wheel speed signals indicate that the locked state of the corresponding wheels is released, the output signal immediately stops being produced. The second circuit is designed so that when at least one of the first circuits starts producing an output signal, an output signal of a predetermined time width for actuating the electromagnetic actuator is immediately produced. Therefore, when at least one of a plurality of selected wheels is brought into a locked state continuously more than a predetermined period of time, it is possible to immediately release the braking force of all the selected wheels only for a predetermined period of time, thus preventing unstable running which is very dangerous. Moreover, the present invention provides a control and compensation device in an anti-skid control system which is simple in construction as a whole and positive in operation, so that even if the anti-skid control system is out of order, safe driving may be always assured without rapidly changing the braking sense.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A control and compensation device in an anti-skid control system including wheel speed detector means for detecting a peripheral speed of each of wheels to produce wheel speed signals related to the peripheral speeds of wheels; a main control circuit for receiving, as input signals, wheel speed signals produced by said wheel speed detector means to produce an anti-skid control signal for controlling the braking force of wheels; an electromagnetic actuator for actuating the anti-skid control device so as to release the braking force of wheels when said electromagnetic actuator is brought into an energized state in accordance with the control signal produced by said main control circuit; an input element for receiving, as input signals, wheel speed signals produced by said wheel speed detector means; a control and compensation circuit connected to said input element for immediately generating an output signal only for a predetermined time when said wheel speed signals indicate a locked state of wheels continuously more than a predetermined time; and an output element for applying an output signal generated by said control and compensation circuit to said electromagnetic actuator for placing said actuator in an energized state.

2. The control and compensation device in an anti-skid control system as defined in claim 1 wherein said control and compensation circuit comprises a first circuit with the wheel speed signals produced by said wheel speed detector means being received as input signals so that when said wheel speed signals indicate the locked state of wheels continuously more than a predetermined time, an output signal immediately is generated and when said wheel speed signal indicates that the locked state of wheels is released, the output signal immediately stops being generated, and a second circuit for producing an output signal of a predetermined time width to actuate said electromagnetic actuator immediately when said first circuit starts to generate an output signal.

3. The control and compensation device in an anti-skid control system as defined in claim 2 wherein said control and compensation device further comprises a reset signal generator for generating a reset signal when the value of a vehicle speed signal representative of the magnitude of vehicle speed is smaller than that of a predetermined low reference vehicle speed signal, said second circuit receiving an output signal of said first circuit and said reset signal as an input signal, said second circuit generating no output signal for placing said electromagnetic actuator in an energized state when said reset signal is received by said second circuit.

4. A control and compensation device as defined in claim 1, wherein said input element comprises operational amplifier means for receiving said wheel speed signals and regulating the wheel speed signal into a pulse waveform signal of predetermined amplitude; said control and compensation circuit comprising monostable multivibrator means connected to the output of said operational amplifier means and being retriggerable for producing a pulse signal of predetermined time duration when a pulse signal is applied to its input; an auxiliary retriggerable monostable multivibrator with input connected to the output of said first-mentioned monostable multivibrator and producing a further pulse signal of predetermined time duration upon receiving an input pulse signal from the output of said first-mentioned monostable multivibrator, said auxiliary monostable multivibrator having an output pulse signal applied to a transistor; a reset signal generator connected to a reset terminal of said auxiliary monostable multivibrator, said reset signal generator generating a reset signal when the vehicle speed is decreased so that anti-skid operation is not required, said auxiliary monostable multivibrator producing no output signal while said reset signal is applied to the reset terminal of said auxiliary monostable multivibrator.

5. A control and compensation circuit in an anti-skid control system including: a plurality of wheel speed detectors disposed one on each of a plurality of wheels for detecting a peripheral speed of a corresponding wheel to produce a wheel speed signal related to the peripheral speed of the corresponding wheel; a main control circuit for receiving, as an input signal, a wheel speed signal produced by each of said wheel speed detectors to produce an anti-skid control signal for collectively controlling the braking force of said plurality of wheels; an electromagnetic actuator for actuating the anti-skid control device so as to collectively release the braking force of each of said wheels when said electromagnetic actuator is placed in an energized state in accordance with the control signal produced by said main control circuit; a group of first circuits, one of said first circuits being disposed in each of said wheels to receive, as an input signal, a wheel speed signal produced by a corresponding wheel speed detector so that when said wheel speed signal indicates a locked state of the corresponding wheel continuously more than a predetermined time, an output signal immediately starts to be produced and when said wheel speed signal indicates that the locked state of the corresponding wheel is released, the output signal immediately stops being produced; and a single second circuit for producing an output signal of a predetermined time width to actuate said electromagnetic actuator immediately when at least one of said group of first circuits starts to produce an output signal.

6. The control and compensation circuit in an anti-skid control system as defined in claim 5 comprising further a plurality of vehicle speed detectors for independently detecting vehicle speeds and a plurality of reset signal generators disposed corresponding to said vehicle speed detectors to produce a reset signal when the value of a vehicle speed signal produced by each of said vehicle speed detectors is smaller than that of a predetermined low reference vehicle speed signal, said second circuit producing no output signal for placing said electromagnetic actuator in an energized state when at least one of said plurality of reset signal generators produces the reset signal.

7. A control and compensation circuit as defined in claim 4, wherein said input element comprises operational amplifier means for receiving wheel speed signals; said control and compensation circuit comprising first retriggerable monostable multivibrator means connected to the output of said operational amplifier means; second retriggerable monostable multivibrator means with input connected to the output of said first monostable multivibrator means; diode means between said first monostable multivibrator means and second monostable multivibrator means; said first monostable multivibrator means comprising at least two monostable multivibrators; said second monostable multivibrator means producing a pulse signal of predetermined time duration, said pulse signal being applied to said electromagnetic actuator through an output transistor; reset signal generator means having an output connected to a reset terminal of said second monostable multivibrator means through diode means, said reset signal generator means receiving output signals of a pair of vehicle speed detectors for independently detecting vehicle speeds and producing respective reset signals when the value of the vehicle speed signal produced by the vehicle speed detectors is smaller than that of a predetermined low reference vehicle speed signal.

* * * * *